United States Patent Office 3,106,424
Patented Oct. 8, 1963

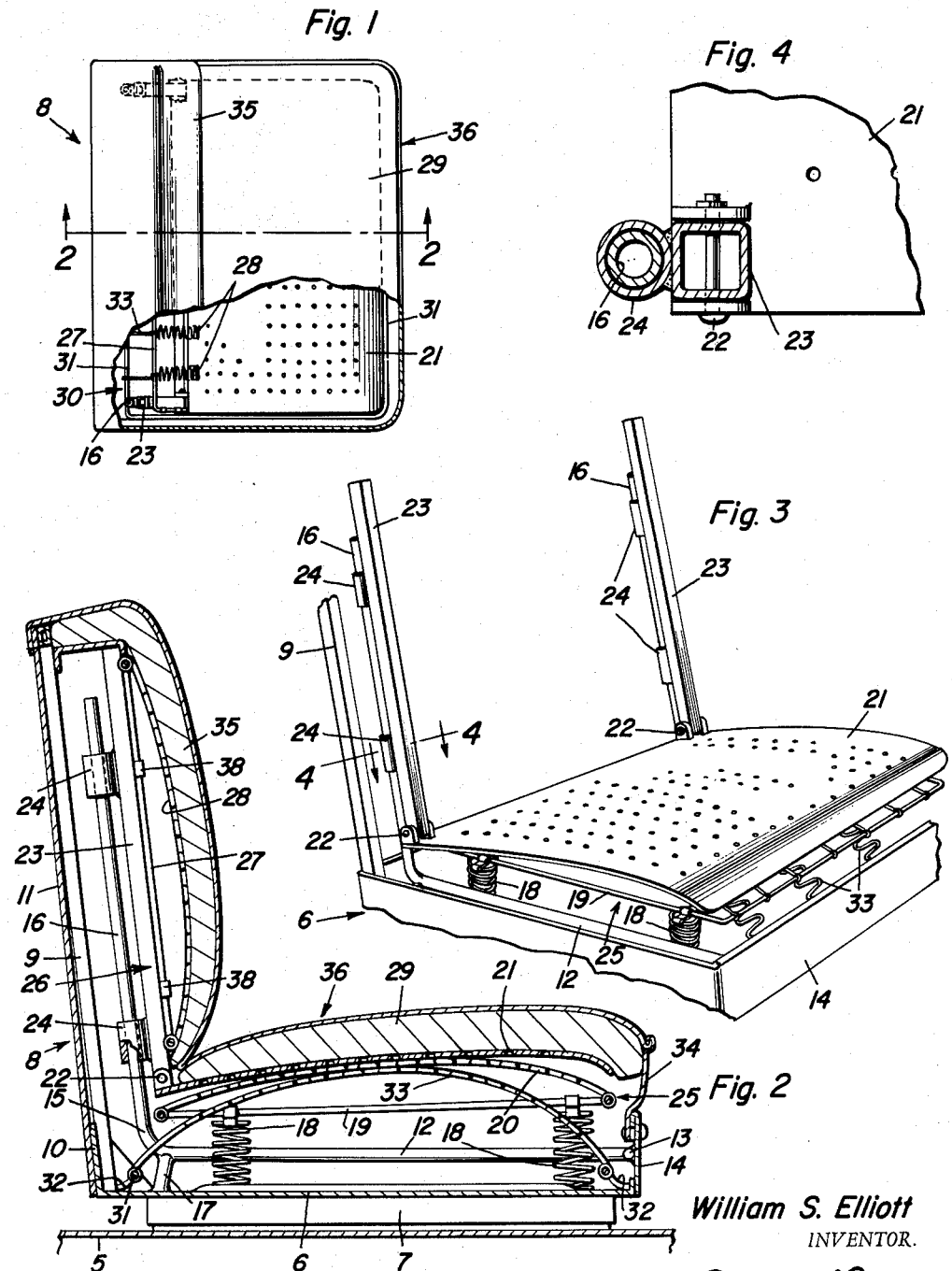

3,106,424
VEHICLE SEAT
William S. Elliott, Box 56, Townsend, Va.
Filed Aug. 31, 1961, Ser. No. 135,231
3 Claims. (Cl. 297—308)

This invention relates to new and useful improvements in vehicle seats of the upholstered, spring type and has for its primary object to provide, in a manner as hereinafter set forth, a seat of this character wherein the back is movable vertically and in unison with the bottom, thus greatly reducing wear, preventing disarrangement and wrinkling of the occupant's clothing and promoting comfort in general.

Another very important object of the present invention is to provide an improved vehicle seat of the aforementioned character comprising novel spring means for yieldingly supporting the unified, vertically movable bottom and back rest.

Other objects of the invention are to provide an improved vehicle seat of the character set forth which will be comparatively simple in construction, strong, durable, compact, of light weight and which may be manufactured and installed at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a top plan view of a vehicle seat constructed in accordance with the present invention with a portion broken away to reveal the interior construction;

FIGURE 2 is a vertical sectional view on an enlarged scale, taken substantially on the line 2—2 of FIGURE 1;

FIGURE 3 is a perspective view of the seat with the upholstery and other parts omitted; and FIGURE 4 is a detail view in horizontal section on an enlarged scale, taken substantially on the line 4—4 of FIGURE 3.

Referring now to the drawing in detail, it will be seen that reference numeral 5 designates a portion of the floor of a motor vehicle. The embodiment of the present invention which has been illustrated comprises a substantially box-like base 6 which is mounted for adjustment in the usual manner, as at 7, on the floor 5.

Rising from the rear portion of the base 6 and fixedly mounted thereon is a back structure 8. In the embodiment shown, the back structure 8 includes a generally inverted U-shaped tubular frame 9 of rectangular cross-section having its end portions affixed to the back portion of the base 6, as indicated at 10. Mounted on the frame 9 is a panel 11 of suitable material.

Mounted longitudinally on the base 6 in vertically spaced relation thereto is a pair of rods 12 of suitable metal. The forward end portions 13 of the rods 12 are affixed to the upstanding front portion 14 of the base structure 6. The rods 12 are bent upwardly, as indicated at 15, to provide upstanding guide posts 16 the purpose of which will be presently set forth. Posts 17 support the rods 12 adjacent the bends 15 on the base 6.

Mounted on the base 6 is a plurality of upstanding coil springs 18. The coil springs 18 provide vertically yieldable supports for a horizontal frame 19 of suitable metal. Mounted longitudinally on the frame 19 is a plurality of spaced, parallel, upwardly bowed serpentine springs 20.

Resting on the upwardly bowed springs 20 is an upwardly bowed, perforated plate 21 of suitable material. Pivotally secured at 22 on the rear portion of the plate 21 is a pair of bars 23. The bars 23 parallel the guides 16. Affixed to the bars 23 are sleeves 24 which are operable on the guides 16 for slidably mounting said bars thereon.

The members 19 and 20 provide a horizontal spring unit which is designated generally by reference numeral 25. Mounted on the bars 23 is a substantially similar spring unit 26 for the back structure 8. The spring unit 26 includes a metallic frame 27 which is secured at 38 on the bars 23. Mounted on the upper and lower members of the frame 27 is a series of forwardly bowed serpentine springs 28.

A seat cushion 29 of suitable material rests on the plate or panel 21. A second spring unit for supporting the plate 21 is indicated at 30. The unit 30 includes a metallic frame 31 mounted horizontally on brackets 32 on the base 6. Mounted on the front and rear members of the frame 31 is a series of upwardly bowed serpentine springs 33 which are engaged beneath the springs 20 and the plate 21.

A suitable flexible connecting strip 34 is provided between the front of the seat cushion 29 and the upstanding front portion 14 of the base structure 6. The spring unit 26 supports a back cushion 35 the upper portion of which is attached in any suitable manner to the top portion of the back structure 8.

It is thought that the use or operation of the invention will be readily apparent from a consideration of the foregoing. Briefly, when the seat bottom, which is designated generally by reference numeral 36, moves downwardly under the weight of an occupant against the tension of the springs 18, 20, 33, etc., the back cushion 35 moves downwardly therewith, there being sufficient flexibility and resilience in said cushion to permit this action when the bars 23, carrying the spring unit 26, slide downwardly on the guides 16. It will thus be seen that the backrest moves vertically in unison with the seat bottom. The plate 21 carrying the seat cushion 29, being pivotally connected at 22 to the bars 23, is rockable on the springs 20 and 33 to automatically adjust to the individual and for added comfort. The springs 33 provide resilient fulcrums on which the unit 25 is rockable and yieldingly support said unit and the seat panel 21 in the event of failure of any of the coil springs 18. Further, the springs 33, of comparatively small radius, come into action to assist in supporting loads beyond the capacity of the springs 18 and 20. As shown in FIGURE 2 of the drawing, the intermediate portions of the upper springs 20 are rockably supported by the corresponding portions of the springs 33. Thus, the unit 30 functions as a base which rockably and resiliently supports the unit 25.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motor vehicle seat comprising, in combination, a horizontal base, a back structure on said base, horizontal rods mounted longitudinally on the base and comprising upstanding rear end portions providing guides in the back structure, bars paralleling the guides, sleeves on said bars slidable on the guides, a spring unit on said bars, a generally horizontal, upwardly bowed plate pivotally mounted for vertical swinging movement on the lower end portions of the bars and extending forwardly therefrom over the base, means on the base yieldingly supporting said plate, and a seat cushion on the plate, said means comprising a stationary frame mounted on the base, a vertically movable frame yieldingly mounted on said base, and upwardly bowed upper and lower serpentine springs on the frames having their ends secured thereto and engaged at an intermediate point beneath the central portion of the plate for providing a yieldable fulcrum therefor.

2. The combination of claim 1, said base comprising an upstanding front portion, said rods being upwardly vertically spaced from the base and including front ends affixed to said upstanding front portion thereof.

3. The combination of claim 2, together with supporting posts for the rods mounted on the base and affixed to said rods adjacent the guides.

References Cited in the file of this patent
UNITED STATES PATENTS

| | | |
|---|---|---|
| 1,767,757 | Harris | June 24, 1930 |
| 2,286,168 | Flint | June 9, 1942 |
| 2,636,544 | Hickman | Apr. 28, 1953 |